E. BROWN.

Steam Oven.

No. 123,230.  Patented Jan. 30, 1872.

Witnesses.
C. F. Brown
M. Church

Inventor.
Edmund Brown
By Hill & Ellsworth
His Attys.

123,230

UNITED STATES PATENT OFFICE.

EDMUND BROWN, OF BURLINGTON, VERMONT, ASSIGNOR TO HIMSELF AND ROSWELL LILLIE, OF SAME PLACE.

IMPROVEMENT IN STEAM-OVENS.

Specification forming part of Letters Patent No. 123,230, dated January 30, 1872.

*To all whom it may concern:*

Be it known that I, EDMUND BROWN, of Burlington, in the county of Chittenden and State of Vermont, have invented certain Improvements in Steam-Ovens; and I do declare the following to be a full and exact description thereof, reference being had to the accompanying drawing forming a part of this specification, in which—

Figure 1:
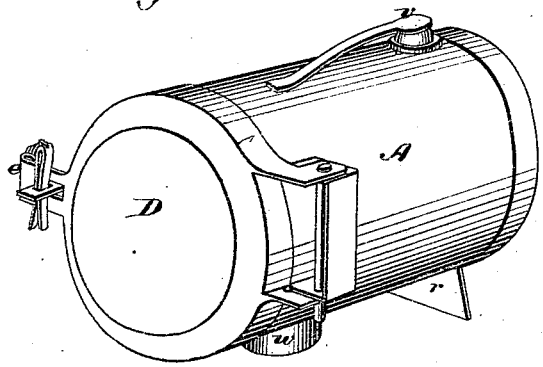
Figure 2:
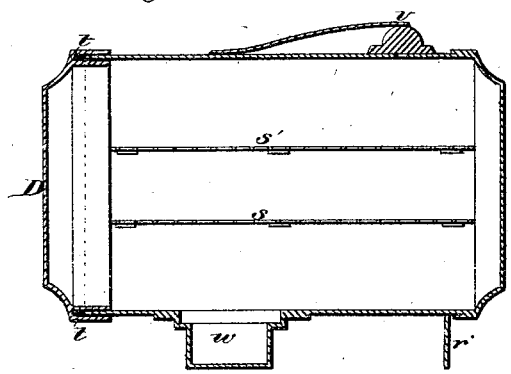

Figure 1 is a perspective view, and Fig. 2 a longitudinal vertical section.

Similar letters of reference indicate the same parts.

The object of this invention is to improve the means of cooking food by steam; and the invention consists in a novel construction of oven adapted to that purpose, by which both the heat from the steam generated in a water-receptacle and the heat from the surface of the stove or range around the water-receptacle are utilized for the purpose of cooking the food and of preventing condensation of steam in the oven.

In the drawing, A is a portable oven, in the form of a horizontal cylinder. The bottom may be flat, but the walls and top are cylindrical, that form being adapted to the prevention of condensation better than any other, and being adapted to carrying off any water of condensation that may be deposited thereon without allowing it to drip upon the food. Near one end the oven is provided with a small water-receptacle, $w$, adapted to project down into the pot-hole of the stove, while the larger portion of the oven rests upon the surface thereof. A rest or support, $r$, may be affixed to the other end of the oven, so that, when desirable, the oven can be set upon the stove, the water-receptacle supporting one end and the rest $r$ the other; and the rest may be so constructed (with a hinge or otherwise) that it can be turned down or back out of the way when not needed for use. The oven is provided with packed door D, fastened securely by means of a wedge-shaped pin, $e$, whereby the wearing away of the packing can be compensated. The packing is shown at $t$, Fig. 2. The oven is also provided with a series of perforated shelves, $s\ s'$, for the support of the vessels which contain the food. At the top an opening is made, and a spring-valve, $v$, is applied thereto, the tension of the spring being adjustable, if desired.

The process by which I cook food by means of the apparatus herein described is substantially as follows: The food being properly prepared and placed in suitable vessels, is set upon the shelves $s\ s'$ and the door is closed and fastened. The valve is set at a pressure of from one to five pounds to the square inch, preferably about one and a half pounds, and the food is subjected to the direct action of the steam at that pressure until it is thoroughly cooked. The water may be either boiling or cold when the food is introduced, and it may or may not be allowed to boil quite away before the cooking is completed. By means of the heat received into the oven through the large exposed surface outside of the water-receptacle $w$ the steam is kept thoroughly dry and hot, while the valve prevents the admission of atmospheric air, although allowing the steam to escape whenever it gets above the required pressure. A pressure of two or three pounds suffices to force the hot steam thoroughly through every part of the food, cooking it very rapidly and uniformly throughout its entire mass.

The apparatus has been thoroughly tested by practical operation in cooking different kinds of food for several months past, and has been found to work perfectly, not only in cooking meats and vegetables, but also in baking all kinds of pies, cakes, and puddings and other delicate pastries, which are exceedingly difficult to cook properly by the old-fashioned ovens.

It has been ascertained by long-continued experiments that if the steam be applied without pressure it will not "bake," in the proper sense of the word, and that, while it can be used for cooking vegetables, meats, and certain kinds of puddings which are prepared for use by boiling rather than baking, it cannot be successfully employed for cakes, pies, bread, and pastries which require dry baking. By using steam under a light pressure, however, and keeping it perfectly dry and hot, as above described, it can be employed for the one as successfully as for the other.

Having thus described my invention, what I claim as new, and desire to secure by Letters Patent, is—

The horizontal cylindrical or semi-cylindrical oven A, having the valve $v$, the shelves $s\ s'$, and the packed door D, when constructed as herein described—that is to say, having the small water-receptacle $w$ projecting below its under surface, around which receptacle is a large surface exposed to the direct heat of the stove for the purpose of drying and superheating the steam generated in the receptacle.

EDMUND BROWN.

Witnesses:
L. HILL,
M. CHURCH.